(12) United States Patent
Lee

(10) Patent No.: US 7,744,362 B2
(45) Date of Patent: Jun. 29, 2010

(54) MOLD TEMPERATURE CONTROL SYSTEM

(75) Inventor: Hsin-Ho Lee, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1077 days.

(21) Appl. No.: 11/438,061

(22) Filed: May 18, 2006

(65) Prior Publication Data

US 2007/0034352 A1    Feb. 15, 2007

(30) Foreign Application Priority Data

Aug. 12, 2005   (CN) .................... 2005 1 0036581

(51) Int. Cl.
  *B29C 35/02*      (2006.01)
(52) U.S. Cl. .................... 425/143; 425/170; 425/384; 425/407; 126/609; 126/656; 126/676
(58) Field of Classification Search ......... 425/143–144, 425/160, 170, 384, 407; 126/609, 656, 658, 126/676
See application file for complete search history.

(56) References Cited

U.S. PATENT DOCUMENTS

| 4,239,638 | A | * | 12/1980 | Beretta et al. | ............... | 126/678 |
| 4,339,930 | A | * | 7/1982 | Kirts | ............... | 126/609 |
| 4,364,239 | A | * | 12/1982 | Chapelle et al. | ............... | 62/235.1 |
| 5,103,802 | A | * | 4/1992 | Thomason | ............... | 126/609 |
| 5,182,117 | A | * | 1/1993 | Ozawa et al. | ............... | 425/144 |
| 6,991,756 | B2 | * | 1/2006 | Saeki et al. | ............... | 425/144 |

FOREIGN PATENT DOCUMENTS

| CN | 2532426 Y | 1/2003 |
| CN | 1641295 A | 7/2005 |
| TW | 483510 | 4/2002 |
| TW | 523000 | 3/2003 |
| TW | M240551 | 8/2004 |

* cited by examiner

*Primary Examiner*—Richard Crispino
*Assistant Examiner*—Thu Khanh T Nguyen
(74) *Attorney, Agent, or Firm*—Jeffrey T. Knapp

(57) ABSTRACT

A temperature control system (100) includes a heating system (1), a cooling system (2) and a control unit (3). The heating system has a heated fluid. The heated fluid is heated by a solar energy for increasing the mold temperature. The cooling system has a cooled fluid. The cooled fluid cools for decreasing the mold temperature. The control unit controls the heating system and the cooling system to be opened or closed.

9 Claims, 5 Drawing Sheets

MOLD TEMPERATURE CONTROL SYSTEM

TECHNICAL FIELD

The present invention relates to a temperature control system and, more particularly, to a temperature control system for a mold.

BACKGROUND

In the process of injection molding, hot molten thermoplastics are periodically injected into a cold mold. Without mold temperature control, the cavity surface will be heated unevenly due to the constant supply of heat from the molten plastic. Therefore, temperature control is a major prerequisite for achieving high molding quality.

A typical temperature control system 99 for a mold is represented in FIG. 5. The temperature control system 99 is shown in use in a mold apparatus. The mold apparatus includes a housing 92 and a media cavity 93 defined therein. The temperature control system 99 includes a control panel 94, a heat exchanger 95, a heater 96, a first electromagnetic valve 98 and a second electromagnetic valve 97. The control panel 94 is located on the housing 92. The mold body 102 also defines therein a media channel (not shown) communicating with the media cavity 93. The media cavity 93 is filled with a media fluid, which flows in the channels for heating or cooling the housing 92 during molding. The heat exchanger 95 is disposed in the media cavity 93, and the heater 96 is disposed on the outside of the media cavity 93 for heating the media fluid. The heat exchanger 95 is connected with the controlling panel 94 and the second electromagnetic valve 97 for controlling the mold cooling process. The heater 96 is connected with the controlling panel 94 and the first electromagnetic valve 98 for controlling the mold heating process. In use, the heater 96 heats the media cavity 93. Then, the media cavity 93 further heats the media fluid. The media fluid transmits the energy to the mold cavity. When cooling, the heat exchanger 95 is filled with cooling water which carries energy from the media fluid so as to decrease the temperature of the mold. Users may control the first electromagnetic valve 98 and the second electromagnetic valve 97 by means of the controlling panel 94 thus enabling the user to control the heating and cooling processes of the mold. However, conventional temperature control systems use an electrical method of heating. This method consumes large amounts of electrical energy both in the heating and in the cooling processes of the mold.

Therefore, a new temperature control system is desired in order to overcome the above-described problems.

SUMMARY OF THE INVENTION

One embodiment of the temperature control system includes a heating system, a cooling system and a control unit. The heating system includes a heated fluid. The heated fluid is heated by solar energy for increasing the mold temperature. The cooling system has a cooled fluid. The cooled fluid can be used for decreasing the mold temperature. The control unit controls the activation of the heating system and the cooling system.

Other advantages and novel features of the present temperature control system will become more apparent from the following detailed description when taken in conjunction with the accompanying drawings.

BRIEF DESCRIPTION OF THE DRAWINGS

Many aspects of the temperature control system for a mold can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EMBODIMENTS

Figure 1:
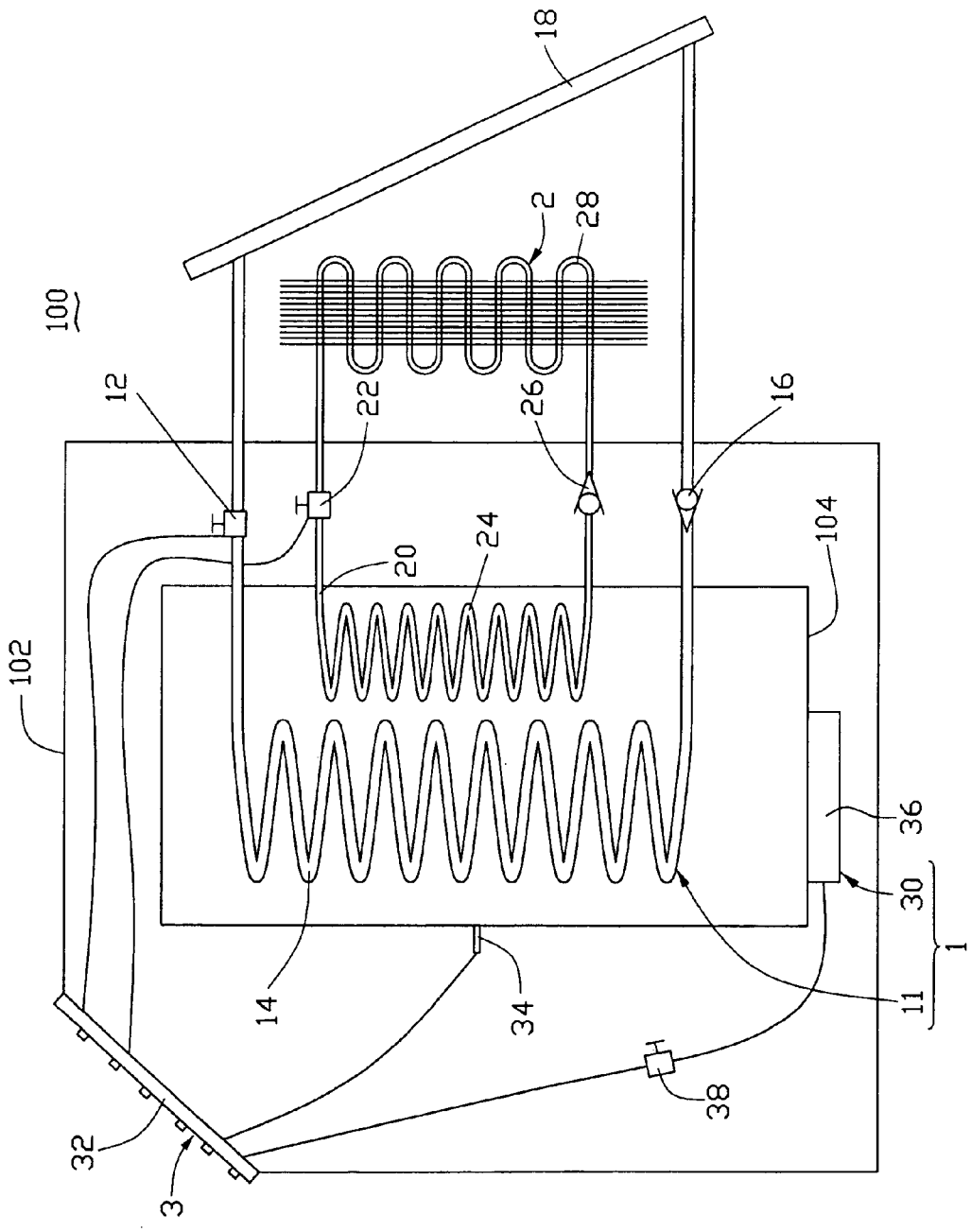
FIG. 1 is a schematic view of an embodiment of the present temperature control system for a mold.

Referring now to the drawings in detail, FIG. 1 shows a temperature control system 100, applied to an injecting mold. It is to be understood, however, that the temperature control system 100 could also be used in other environments (e.g. casting molds). As such, although proving particularly advantageous when used in injecting mold, the temperature control system 100 should not be considered limited in scope solely to an intended use environment. The injecting mold includes a mold body 102 with a media cavity 104 defined therein. The mold body 102 also defines therein a media channel (not shown) communicating with the media cavity 104. The media cavity 104 is filled with a media fluid, which flows in the channels for heating or cooling the mold body 102 during molding.

The temperature control system 100, in the embodiment illustrated, includes a heating system 1, a cooling system 2 and a control unit 3. The heating system 1 includes a solar heating system 11 and an electrical system 30.

Figure 2:
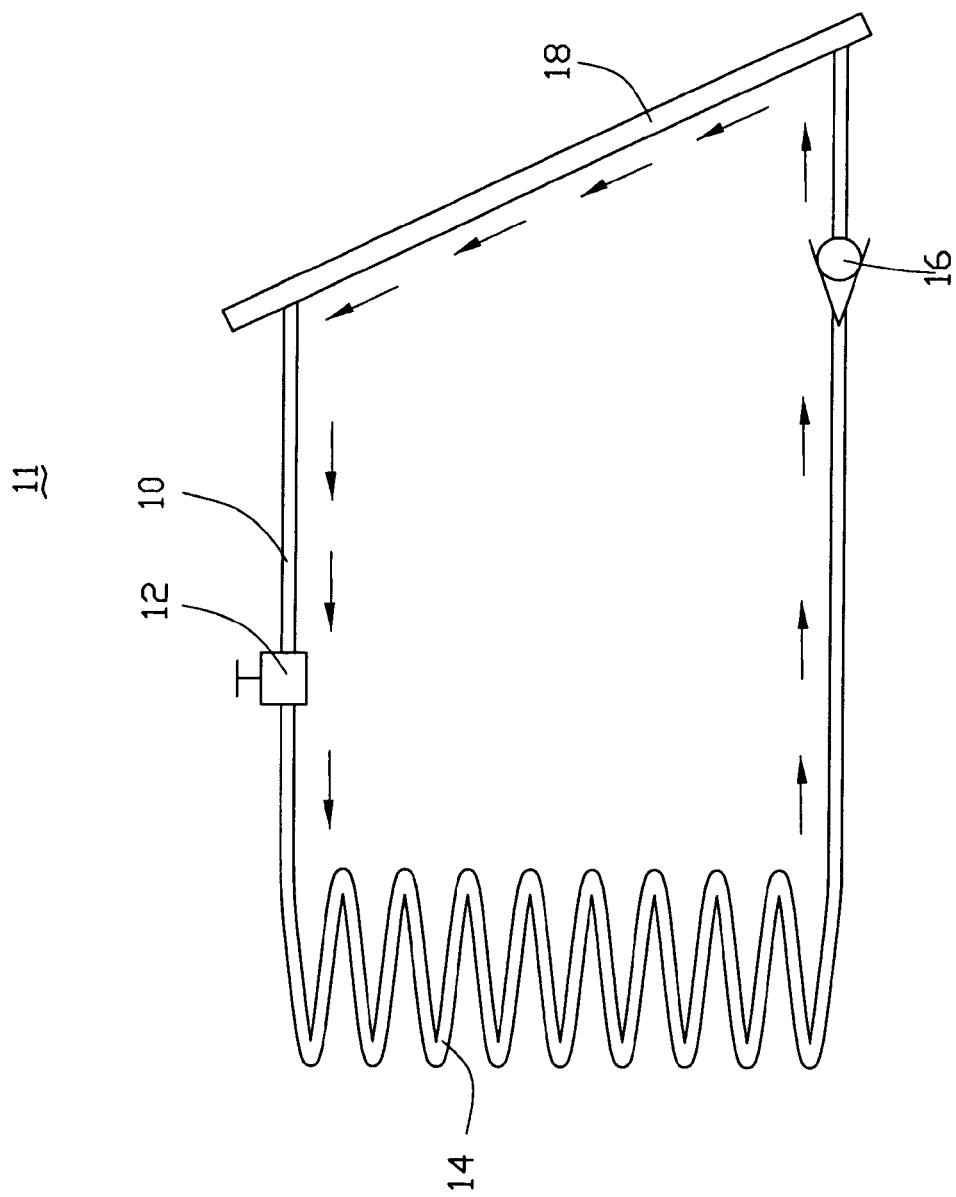
FIG. 2 is a schematic view of the heating system of FIG. 1.

Referring also to FIG. 2, the solar heating system 11 includes a first electromagnetic valve 12, a first pipe 14, a first check valve 16 and a collector 18. The above elements are connected with each other in that order by means of a fluid transmission channel, thereby forming a loop/circuit. The heating system 1 is filled with a heating fluid 10, and the heating fluid 10 is circulated so as to heat the media fluid in the media cavity 104, thereby heating the mold body.

The electromagnetic valve 12 acts as a switch for the heating system 1, being capable of either blocking or allowing through-put of the fluid 10. The first pipe 14 is disposed in the media cavity 104. The first pipe 14 is configured to have a spiral structure in order to provide a larger contact area with the media fluid in the media cavity 104. This design may help energy conduction and allow the mold to be heated fully. The check valve 16 is a one-way valve element which can ensure that the hot fluid 10 of the heating system 1 flows only along a single direction.

Figure 3:
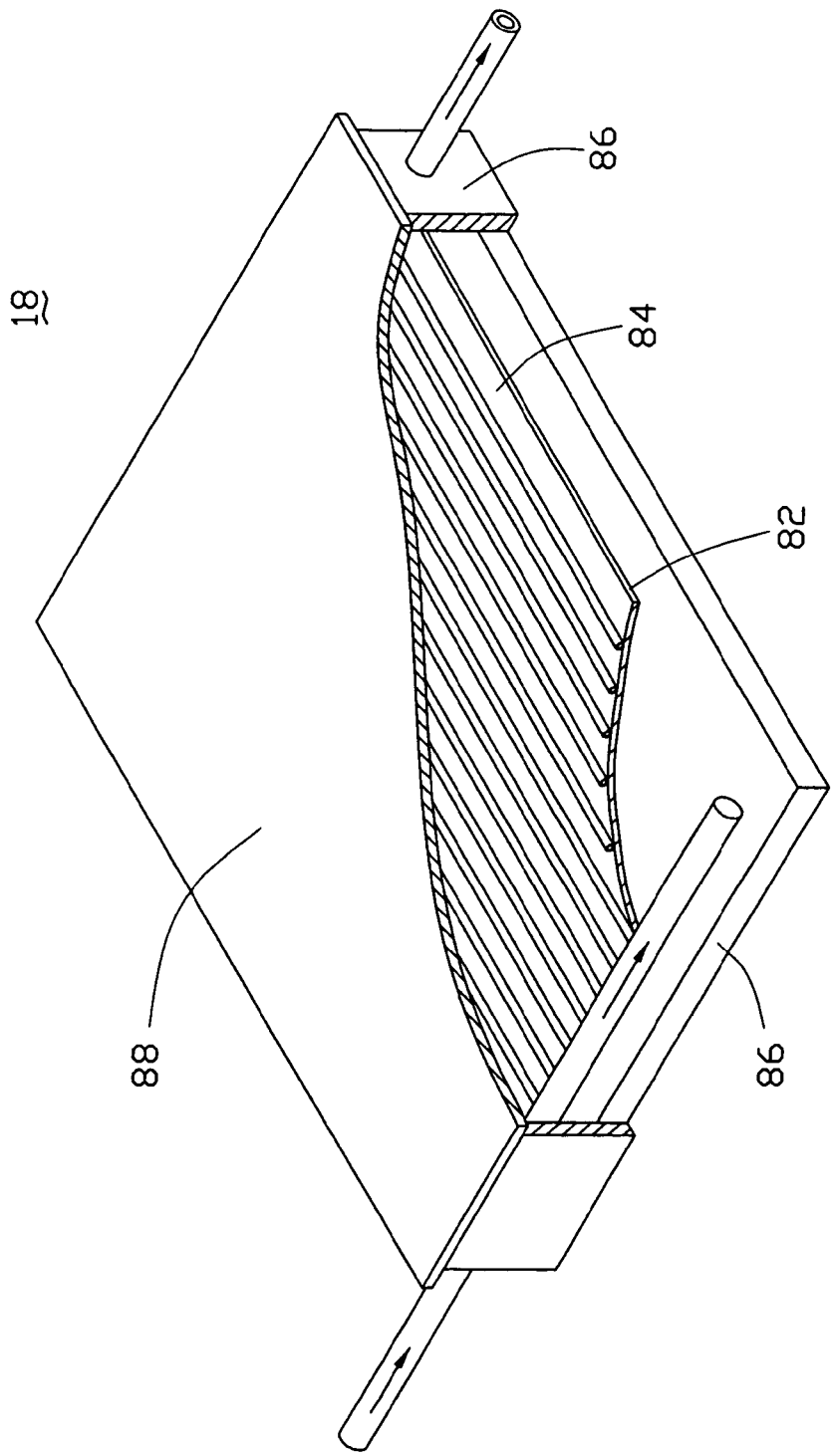
FIG. 3 is an isometric view of the collector of FIG. 1.

The collector 18 is an absorbing portion of the heating system 1. The collector 18 is disposed at a position where the sun my directly irradiate it so that it may absorb solar energy. Referring also to FIG. 3, the collector 18 includes an absorbing panel 82, a selective coating 84, heat insulation layer 86 and a transparent cover 88. The absorbing panel 82 includes a number of parallel tubes (not labeled). The fluid 10 may pass through the tubes from an input end of the collector 18 to an output end of the collector 18 so that the fluid 10 is heated by the absorbing panel 82. The selective coating 84 is disposed on the absorbing panel 82. The selective coating 84 is chosen to have properties which permit the collector 18 to absorb a large portion of the sun's wave radiation. An example of the type of selective coating 84 is black chrome or other dark color paints which provide high absorption and low emissivity. The heat insulation layer 86 encloses the absorbing panel 82 at two sides and a bottom thereof, thereby decreasing heat conduction to the surrounding environment. The transparent cover 88 covers the absorbing panel 82. The transparent cover 88 not only separates the absorbing panel 82 from the air to decrease the energy loss owing to heat conduction or heat convection, but also avoids impurities or dust to drop onto the absorbing panel 82.

The flow of the heated fluid 10 of the solar heating system 11 may be driven to circulate under the thermo-syphon heat pipe principle. The electrical system 30 includes an electric heater 36 and a third electromagnetic valve 38. The electric heater 36 is disposed outside of the mold cavity 104 for heating the mold and is electrically connected with the control panel 32. The third electromagnetic valve 38 is for controlling the open and close of the electric heater 36.

Figure 4:
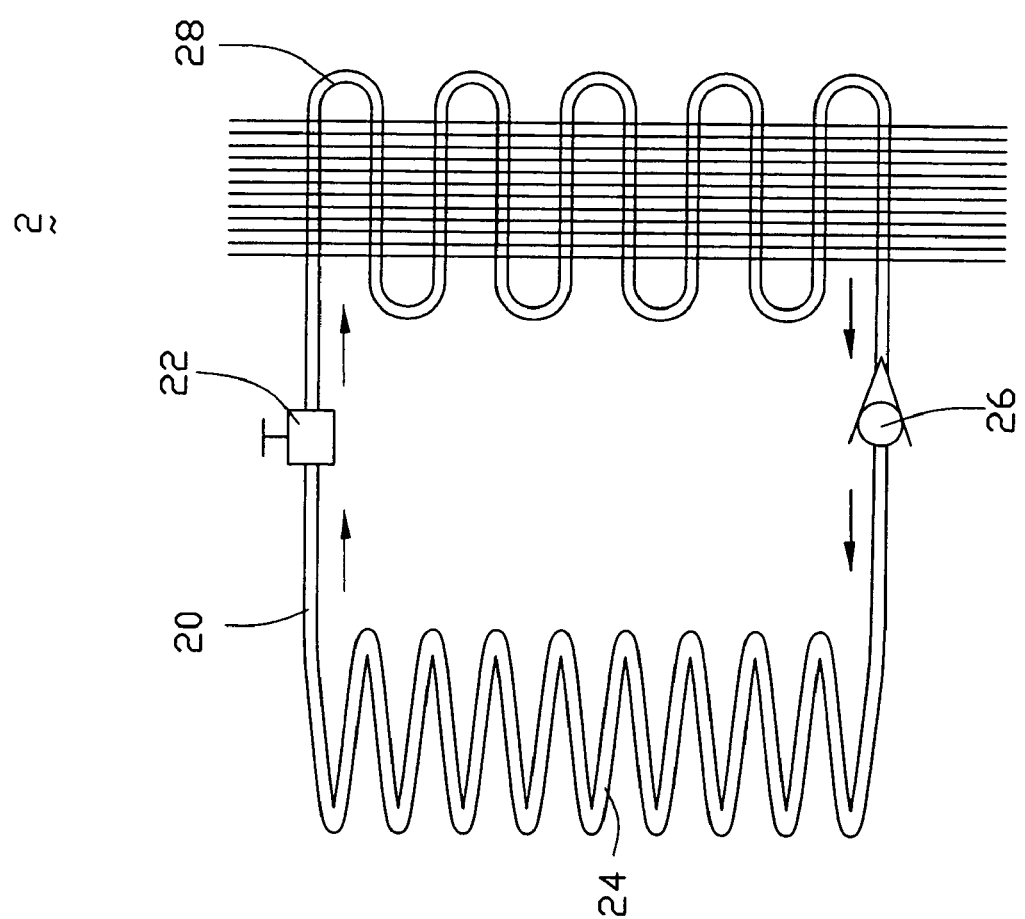
FIG. 4 is a schematic view of the cooling system of FIG. 1.
Figure 5:
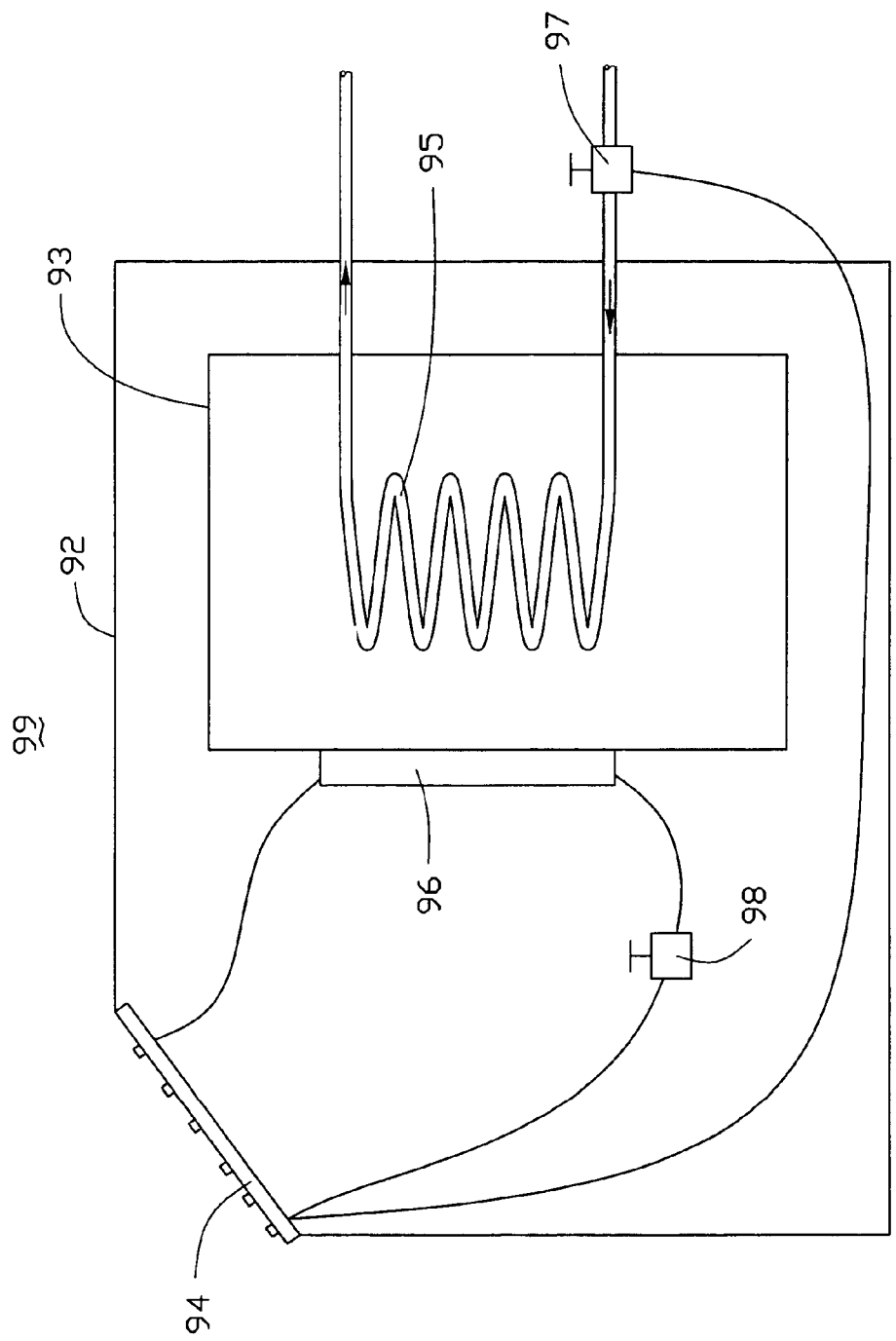
FIG. 5 is a schematic view of a conventional temperature control system for a mold.

Referring to FIG. 4, the cooling system 2 includes a second electromagnetic valve 22, a second pipe 24, a second check valve 26 and a heat exchanger 28.

The second electromagnetic valve 22 act as a switch for the cooling system 2, being capable of either blocking or allowing through-put of the cooled fluid 20. The second pipe 24 is also disposed in the media cavity 104. The second pipe 24 is also configured to have a spiral structure in order to provide a larger contact area with the media fluid in the media cavity 104. This design may help heat conduction and allow the media fluid to fully cool. The second check valve 26 is a one-way valve element which can ensure that the cooled fluid 20 of the cooling system 2 flows along one direction only. The heat exchanger 28 allows heat energy to be discharged as part of the cooling system 2. The heat exchanger 28 can be a kind of a fin tube heat exchanger. The fin tube heat exchanger may effectively improve heat transfer to the surrounding environment.

The control unit 3 includes a control panel 32 and a thermocouple 34. The control panel 32 is connected with the first electromagnetic valve 12, the second electromagnetic valve 22 and the third electromagnetic valve 38. Users may send a control signal through the control panel 32 so as to control the opening and closing of the first electromagnetic valve 12, the second electromagnetic valve 22 and the third electromagnetic valve 38. The thermocouple 34 is electrically connected to the control panel 32, thereby detecting the temperature of the mold. The detected result is shown on the control panel 32 so as to help users operate the mold.

In use, the collector 18 firstly collects the solar energy and stores the solar energy for use. Then, the first electromagnetic valve 12 is opened by means of the control panel 32 when the mold needs to be heated. The heat absorbed by the collector 18 evaporates the fluid 10 and the evaporated fluid 10 is transmitted along the first pipe 14. The first pipe 14 conducts the heat energy of the heated fluid 10 to the media cavity 104 of the mold. Accordingly, the temperature of the mold is increased. After the fluid 10 transmits the heat energy to the mold, the temperature of the fluid 10 is decreased and thus condensed back to liquid. The fluid 10 with a decreased temperature under thermo-syphon heat pipe principle again flows into the collector 18 so as to be heated. After a number of such circulations, the mold can be heated to a temperature of about 100~120 C.°. The control panel 32 may detect the temperature of the heated mold. If the mold temperature does not satisfy the required temperature, the control panel 32 will automatically control the third electromagnetic valve 38 to activate the electric heater 36, heating the mold cavity until a desired temperature is reached. Because of the subsidiary solar heating system 11, the mold temperature control system 100 may greatly decrease the electrical energy consumption. When the mold needs to be cooled, the second electromagnetic valve 22 is opened by means of the control panel 32. The cool fluid 20 heated by the media fluid in the media cavity 104, flows to the heater exchanger 28 under the thermo-syphon heat pipe principle. The heat energy of the fluid 20 is transferred to the heater exchanger 28 and then dissipated to ambient air. After a number of circulations, the mold temperature will drop to the desired temperature.

In the above-mentioned embodiments, the spiral structure of the first heat pipe act as a first condensing portion, and the collector thereof act as a first evaporating portion. The first condensing portion is received in the media cavity, and the first evaporating portion is located outside the media cavity. Understandably, the first condensing portion disclosed above may be replaced with other structures.

In the above embodiment, the electrical heater is configured for heating the mold body to a predetermined temperature which the mold body cannot reach if heated by the first heat pipe alone.

In the above embodiment, the temperature control system may adopt oils as heating transfer medium or cooling transfer medium. The use of a solar power is a more environmentally friendly source of power.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A mold temperature control system, comprising:
a heating system having a heated fluid, the heated fluid heated by a solar energy heating system and an electrical system for increasing the mold temperature, the heated fluid being driven to circulate under the thermo-syphon heat pipe principle, the electrical system heating the heated fluid to a predetermined temperature which the heated fluid cannot reach if heated by the solar energy alone, wherein the solar heating system comprises a first electromagnetic valve, a first pipe, a first check valve ensuring the heated fluid only flows in a single direction and a collector for absorbing solar energy, the collector being connected with the first electromagnetic valve, the first pipe and the first check valve;
a cooling system, the cooling system having a cooled fluid for decreasing the mold temperature; and
a control unit, the control unit controlling the activation of the heating system and the cooling system.

2. The temperature control system as claimed in claim 1, wherein the first pipe has a spiral structure providing a larger contact area with the heated fluid.

3. The temperature control system as claimed in claim 1, wherein the collector includes an absorbing panel and a selective coating, the selective coating being disposed on the absorbing panel.

4. The temperature control system as claimed in claim 3, wherein the selective coating is black chrome.

5. The temperature control system as claimed in claim 3, wherein the collector further comprises a heat insulation layer, and the heat insulation layer encloses the sides and bottom of the absorbing panel.

6. The temperature control system as claimed in claim 3, wherein the collector further comprises a transparent cover, and the transparent cover covers the absorbing panel.

7. The temperature control system as claimed in claim 1, wherein the cooling system includes a second electromagnetic valve, a second pipe, a second check valve and a heat exchanger, which are connected in that order.

8. The temperature control system as claimed in claim 7, wherein the heat exchanger is a fin tube heat exchanger.

9. The temperature control system as claimed in claim 7, wherein the electrical system comprises an electric heater and a third electromagnetic valve, and the third electromagnetic valve controls the activation of the electric heater.

* * * * *